United States Patent Office 3,346,810
Patented Oct. 10, 1967

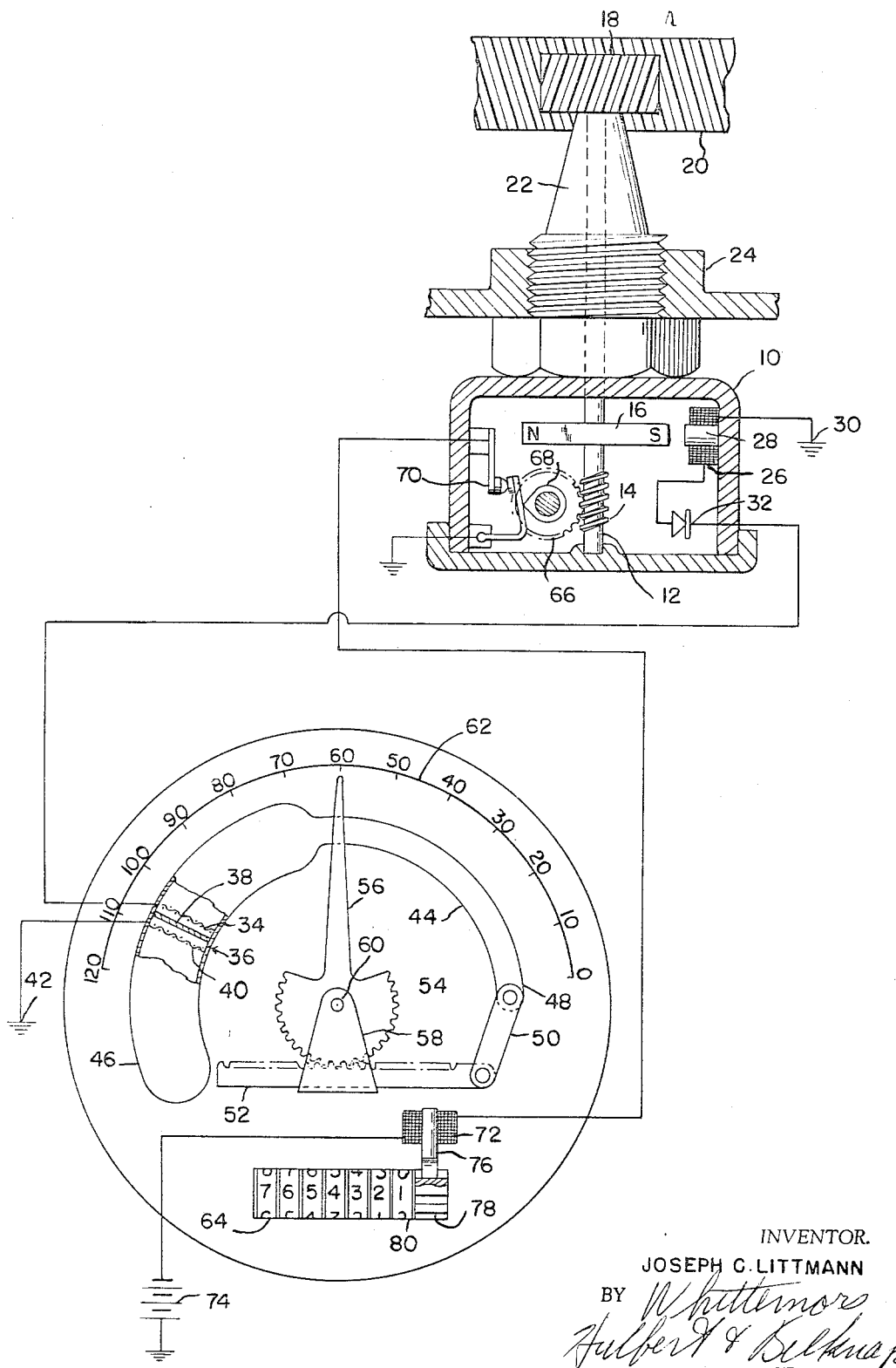

3,346,810
SPEEDOMETER UNIT INCLUDING AN ELECTRO-OSMOTIC PUMP ACTUATED INDICATOR
Joseph C. Littmann, Grosse Pointe Woods, Mich., assignor to Ferro Manufacturing Corporation, a corporation of Michigan
Filed Mar. 16, 1964, Ser. No. 351,980
7 Claims. (Cl. 324—70)

The present invention relates to a speedometer-odometer unit.

It is an object of the present invention to provide means for determining and indicating the speed of a rotary member which includes an electrical generator for generating a voltage variable in accordance with speed, and speed indicating mechanism including a pump responsive to variations in applied voltage capable of developing a fluid pressure in accordance with such voltage, and a speed indicator connected to said pump responsive to changes in fluid pressure to indicate such changes in terms of speed.

More specifically, it is an object of the present invention to provide a generator adapted to be driven at a speed variable in accordance with the speed to be measured, an electrical osmosis pump connected to said generator, a shaped receptacle adapted to change its shape upon variations in pressure therein, and an indicator connected to said receptacle.

It is a further object of the present invention to provide an osmosis pump connected to supply fluid under pressure to a Bourdon tube, a speed indicator connected to the Bourdon tube, and a speed responsive generator electrically connected to said osmosis pump to apply a voltage thereto variable in accordance with the speed to be measured.

It is a further object of the present invention to provide in combination with the speed responsive and indicating mechanism described in the foregoing, an odometer including a mileage indicator, pawl and ratchet mechanism connected thereto, a solenoid connected to said pawl and ratchet mechanism, and switch means in the solenoid circuit operable periodically after predetermined rotation of a rotary member driven at speeds variable with the speed to be measured.

It is a further object of the present invention to provide a speedometer-odometer unit in which connections to the speed and mileage indicating mechanism are electrical wires.

Other objects and features of the invention will become apparent as the description proceeds, especially when taken in conjunction with the accompanying drawing, illustrating a preferred embodiment of the invention, wherein:

The figure is a diagrammatic view of the speedometer-odometer assembly, with parts in section.

In the figure there is illustrated a housing 10 in which is journaled a shaft 12 having a worm section 14 thereon and carrying a magnet 16. At its upper end the shaft 12 is connected to a pinion 18 in mesh with a gear 20 formed on a shaft which is driven at a speed variable in accordance with road speed of a motor vehicle. The gear 20 may thus be provided on the propeller shaft of the vehicle or a shaft geared thereto. In accordance with the present invention, since the connections between the rotary driven elements and the speed and mileage indicating units is by electrical wires, it will of course be appreciated that the shaft 12 may be parallel to the propeller shaft of the vehicle, thus avoiding the troublesome necessity of employing the usual high angle gearing presently employed to effect a drive of the speedometer cable. The housing 10 is connected to a threaded support member 22 adapted to be threaded into a correspondingly threaded boss 24 on the transmission housing.

Within the housing 10 there is provided a coil 26 having a core 28, one side of the coil being grounded as indicated at 30. The other side of the coil is connected through a rectifier 32 to a grid 34 of an osmosis pump indicated generally at 36. The osmosis pump includes a porous membrane 38 and a second grid 40 which is grounded as indicated at 42.

With the foregoing arrangement, as the poles of the magnet 16 sweep past the coil or winding 26 voltage pulses are generated in the coil, the magnitude of which varies substantially directly with the speed of rotation of the magnet. With the arrangement shown, the rectifier 32 passes only the pulses of appropriate polarity to cause the osmosis pump 36 to develop an elevated pressure at the side where the grid 34 is located. It will of course be appreciated that the rectifier 32 might be eliminated if the magnet 16 were arranged so that only one of its poles traversed the coil 26.

The osmosis pump indicated generally at 36 is located in a shaped receptacle having the characteristic of changing its shape upon variations in internal pressure. The reduced portion 44 of the receptacle 46 may be regarded as the equivalent of a Bourdon tube and the effect of the osmosis pump 36 is to provide a pressure differential at opposite sides thereof so that upon an increase in speed there is an increase in pressure in the reduced portion 44 of the receptacle 46, thus causing it to tend to straighten out and causing its free end 48 to move to the right. The end portion 48 of the Bourdon tube is connected by a link 50 to a rack 52 meshing with a pinion sector 54 on the indicating pointer 56. The rack 52 is retained in mesh with the pinion portion 54 by a stirrup 58 pivoted as indicated at 60 to the pivot mount for the pointer 56. Accordingly, the pointer 56 is caused to swing about the axis of its pivot mounting 60 and the speed of the vehicle is indicated on a scale 62.

In order to provide for actuation of the odometer indicated generally at 64, the worm 14 on the shaft 12 meshes with a worm gear indicated at 66. The worm gear 66 carries a cam 68 adapted to close a normally open switch 70 once during each rotation thereof. The switch 70 is in a circuit including a solenoid winding 72 and the grounded battery 74. The solenoid includes a plunger 76 in the form of a pawl associated with a ratchet 78 connected to the first wheel 80 of the odometer. Thus, when the switch 70 is closed by rotation of the cam 68, the solenoid is actuated advancing the odometer wheel 80 one division which is effective as is well understood to effect appropriate rotation of the remaining wheels indicated to the left of the wheel 80. It will be course be appreciated that the illustration of the worm and worm gear is diagrammatic and that if desired, further reduction between the shaft 12 and the cam 68 may be provided by conventional means.

With the present system of measuring and indicating speed and distance of a motor vehicle it is apparent that the connections between the portions of the system which are driven in rotation at speeds in accordance with vehicle speed to the parts of the system indicating vehicle speed and distance traveled are in the form of wires. Heretofore, conventional practice has been to provide a flexible cable drive extending to the speedometer. This has numerous disadvantages including the fact that the flexible drive cable is often noisy in operation and produces irregularity or unsteadiness in the pointer 56. A further serious disadvantage in prior systems which is overcome by the present system is the elimination of the necessity for right angle drive gears which in the past has been the source of considerable trouble. In the present system, since it is immaterial whether the shaft 12 extends vertically, horizontally, or at an angle, it is possible to so locate the housing 10 that the shaft 12 is parallel to the transmission shaft from which its drive is taken. This permits the gearing interconnecting the shafts to be ordinary spur gearing or cylindrical gears of appropriate low helix angle.

While the output of the generator including the coil 26 is in the form of pulses, the pressure developed within the portion of the container or receptacle 46 including the Bourdon tube 44 remains at a substantially constant pressure which is variable in accordance with road speed of the vehicle. In other words, there is no appreciable variation in pressure within the Bourdon tube between the successive pumping actions induced by the applied voltage differentials to the osmosis pump. It will of course be appreciated that the frequency of the voltage pulses also varies directly in accordance with road speed of the vehicle. However, even at low speeds the flow through the membrane 38, due to the character of the membrane and the viscosity of the fluid, is such that there is no appreciable variation in pressure in the Bourdon tube portion 44 of the container at constant road speed of the vehicle. On the other hand, it has been established that the pressure which is maintained at one side of the osmosis pump in the system disclosed is directly proportional to the applied voltage which in turn is directly proportional to road speed of the vehicle.

The drawing and the foregoing specification constitute a description of the improved speedometer-odometer unit in such full, clear, concise and exact terms as to enable any person skilled in the art to practice the invention, the scope of which is indicated by the appended claims.

What I claim as my invention is:

1. A speedometer comprising a unidirectional pulse generator comprising a rotor, means for driving said rotor at a speed variable in accordance with the speed to be measured, an electrical osmosis pump connected to said generator effective to develop a fluid pressure dependent on the speed to be measured, and speed indicating means comprising a Bourdon tube connected to said pump, and a speed indicator connected to said tube.

2. A speedometer for a motor vehicle comprising a rotor shaft parallel to a transmission shaft of the vehicle and connected thereto by cylindrical gears, an electrical generator including a rotor connected to said shaft, means for driving said rotor at a speed variable in accordance with the speed to be measured, an electrical osmosis pump connected to said generator effective to develop a fluid pressure dependent on the speed to be measured, and speed indicating means comprising a Bourdon tube connected to said pump, and a speed indicator connected to said tube.

3. An indicator comprising a unitary receptacle forming a closed chamber, an electro-osmosis pump in said chamber dividing said chamber into two parts, means for applying a variable voltage to said pump, one of the parts of said chamber having a closed elongated curved extension in fluid communication therewith, said extension having a free end portion movable as the curvature of said extension varies with variations in pressure of liquid therein, a scale, a pointer movable over said scale, and means connecting said pointer and the free end of said extension.

4. An indicator comprising a closed chamber having an electro-osmosis pump therein, said chamber having a main portion containing said pump and a closed elongated curved extension in fluid communication with said main portion, said extension having a free end portion remote from said main portion movable as the curvature of said extension varies with variations in pressure of liquid therein, a scale, a pointer movable over said scale, means connecting said pointer and the free end of said extension, a rotary shaft whose speed is to be indicated by said indicator, magnet means on said shaft, a pick-up coil adjacent the path of said magnet means, a circuit connecting said coil to said pump, and a rectifier in said circuit.

5. An indicator as defined in claim 4 in which said shaft is a vehicle transmission shaft, the use of the magnet means and pick-up coil eliminating the necessity for a speedometer cable and the gearing conventionally used to connect the shaft to a speedometer.

6. An indicator as defined in claim 5, an odometer, actuating means for said odometer comprising a solenoid actuated pawl and ratchet advancing device, a switch controlling said solenoid, a switch actuating means comprising worm and worm gear means connected between said transmission shaft and said switch.

7. A speedometer for a vehicle comprising a voltage generator located adjacent and coupled to a rotary transmission component of the vehicle, said generator comprising a pick-up coil and rotary magnetic means operable to develop an effective voltage which is linearly related to vehicle speed, an electro-osmosis pump at the driver's compartment and which accordingly is remote from the generator, means electrically connecting said generator to said pump, and pressure responsive indicating means calibrated in terms of vehicle speed visible in said driver's compartment.

References Cited

UNITED STATES PATENTS

| | | | |
|---|---|---|---|
| 1,772,152 | 8/1930 | Luckey | 73—518 |
| 2,295,118 | 9/1942 | LeClair | 324—70 |
| 3,046,481 | 7/1962 | Wood | 324—70 |
| 3,209,255 | 9/1965 | Estes | 324—94 |

OTHER REFERENCES

"Principles of Very Low Power Electrochemical Control Devices," Journal of the Electrochemical Society, vol. 104, No. 12, December 1957, pp. 727–730. (Copy in 324–94, Group 260.)

Traite De Physique, P. A. Daguin, Pub. 1867, pp. 444–445.

The Instrument Manual, Third Edition, 1960.

ARCHIE R. BORCHELT, *Primary Examiner.*

WALTER L. CARLSON, *Examiner.*

M. J. LYNCH, *Assistant Examiner.*